US006724587B2

United States Patent
Gill (10) Patent No.: US 6,724,587 B2
(45) Date of Patent: Apr. 20, 2004

(54) LOW TEMPERATURE YOKE TYPE TUNNEL VALVE SENSOR

(75) Inventor: Hardayal Singh Gill, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 171 days.

(21) Appl. No.: 09/878,817

(22) Filed: Jun. 11, 2001

(65) Prior Publication Data

US 2002/0186515 A1 Dec. 12, 2002

(51) Int. Cl.[7] .............................................. G11B 5/127
(52) U.S. Cl. .................................................. 360/324.2
(58) Field of Search ...................................... 360/324.2

(56) References Cited

U.S. PATENT DOCUMENTS

| | | | |
|---|---|---|---|
| 4,291,351 A | | 9/1981 | Pennell et al. .............. 360/113 |
| 5,493,467 A | * | 2/1996 | Cain et al. .................. 360/321 |
| 5,508,868 A | | 4/1996 | Cheng et al. ............... 360/113 |
| 5,627,704 A | | 5/1997 | Lederman et al. .......... 360/113 |
| 5,636,093 A | | 6/1997 | Gijs et al. ................... 360/126 |
| 5,731,937 A | | 3/1998 | Yuan .......................... 360/113 |
| 5,751,521 A | * | 5/1998 | Gill ............................ 360/314 |
| 5,822,158 A | | 10/1998 | Matsuzono ................. 360/113 |
| 5,862,022 A | | 1/1999 | Noguchi et al. ............ 360/113 |
| 5,898,547 A | | 4/1999 | Fontana, Jr. et al. ....... 360/113 |
| 5,905,611 A | | 5/1999 | Yoda et al. ................. 360/113 |
| 5,930,084 A | | 7/1999 | Dovek et al. ............... 360/113 |
| 5,930,087 A | | 7/1999 | Brug et al. ................. 360/113 |
| 6,064,552 A | | 5/2000 | Iwasaki et al. ............. 360/113 |
| 6,541,104 B2 | * | 4/2003 | Akimoto et al. ............ 428/212 |
| 6,552,882 B1 | * | 4/2003 | Hayashi .................. 360/324.2 |
| 2001/0009490 A1 | * | 7/2001 | Yamanaka et al. ......... 360/317 |
| 2001/0040777 A1 | * | 11/2001 | Watanabe et al. .......... 360/321 |
| 2002/0018324 A1 | * | 2/2002 | Machida et al. ......... 360/324.2 |

FOREIGN PATENT DOCUMENTS

| | | | |
|---|---|---|---|
| JP | 8115511 | 5/1996 | ........... G11B/5/39 |
| JP | 11353625 | 12/1999 | ........... G11B/5/39 |
| JP | 2000-076627 | 3/2000 | ........... G11B/5/39 |
| JP | 2000-076628 | 3/2000 | ........... G11B/5/39 |
| WO | WO99/22368 | 6/1999 | ........... G11B/5/39 |

OTHER PUBLICATIONS

IBM Tech. Discl. Bull. vol. 26, No. 7A, Dec. 1983 "Self–Aligned Two–step Process for...".
IBM Tech. Discl. Bull. vol. 21, No. 7, Dec. 1978 "Flux Extender for Magnetoresistive Head".
IEEE Trans. vol. 35, No. 5, p. 2586–8, "The electrical and magnetic response of yoke–type...".
Research Disclosure 198, Jan. 2000, disclosed by IBM Corp.
Research Disclosure 1712, Dec. 1999, disclosed by IBM Corp.

* cited by examiner

Primary Examiner—Mark Blouin
(74) Attorney, Agent, or Firm—Ervin F. Johnston (57) ABSTRACT

A read head includes electrically conductive ferromagnetic first and second yoke layers and a tunnel valve sensor which is recessed from the ABS and is located between the first and second yoke layers. The first and second yoke layers extend to an air bearing surface (ABS) for conducting flux to the sensor and extend into the head beyond the sensor. A bottom copper structure interfaces a bottom surface of the tunnel valve sensor and a top copper structure interfaces a top surface of the tunnel valve sensor. In a first embodiment of the invention, the first and second copper structures conduct heat from the sensor to the first and second yoke layers respectively, and in a second embodiment of the invention the bottom copper structure conducts heat to a substrate while the top copper structure conducts from the sensor to the second yoke layer. Further, in the first embodiment the first and second yoke layers serve as leads for a tunneling current while in the second embodiment the bottom copper structure and the second yoke layer serve as leads for the tunneling current.

27 Claims, 8 Drawing Sheets

LOW TEMPERATURE YOKE TYPE TUNNEL VALVE SENSOR

BACKGROUND OF THE INVENTION

1. Field of the Invention

The present invention relates to a low temperature yoke type tunnel valve sensor and, more particularly, to such a sensor wherein first and second copper structures conduct heat to at least one of two yoke layers wherein the yoke layers conduct a tunneling current ($I_T$) to the tunnel valve sensor and transmit flux from an air bearing surface (ABS) to the sensor.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel valve sensor for sensing the magnetic signal fields from the rotating magnetic disk. The sensor includes a nonmagnetic electrically nonconductive tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel valve sensor is located between ferromagnetic first and second shield layers. First and second leads, which may be the first and second shield layers, are connected to the tunnel valve sensor for conducting a tunneling current therethrough. The tunneling current is conducted perpendicular to the major film planes (CPP) of the sensor as contrasted to a spin valve sensor where a sense current is conducted parallel to the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, is when the tunneling current is conducted through the sensor without magnetic field signals from the rotating magnetic disk.

When the magnetic moments of the pinned and free layers are parallel with respect to one another the resistance of the tunnel valve sensor to the tunneling current ($I_T$) is at a minimum and when their magnetic moments are antiparallel the resistance of the tunnel valve sensor to the tunneling current ($I_T$) is at a maximum. Changes in resistance of the tunnel valve sensor is a function of cos θ, where θ is the angle between the magnetic moments of the pinned and free layers. When the tunneling current ($I_T$) is conducted through the tunnel valve sensor, resistance changes, due to field signals from the rotating magnetic disk, cause potential changes that are detected and processed as playback signals. The sensitivity of the tunnel valve sensor is quantified as magnetoresistive coefficient dr/R where dr is the change in resistance of the tunnel valve sensor from minimum resistance (magnetic moments of free and pinned layers parallel) to maximum resistance (magnetic moments of the free and pinned layers antiparallel) and R is the resistance of the tunnel valve sensor at minimum resistance. The dr/R of a tunnel valve sensor can be on the order of 40% as compared to 10% for a spin valve sensor.

The first and second shield layers may engage the bottom and the top respectively of the tunnel valve sensor so that the first and second shield layers serve as leads for conducting the tunneling current ($I_T$) through the tunnel valve sensor perpendicular to the major planes of the layers of the tunnel valve sensor. The tunnel valve sensor has first and second side surfaces which intersect the ABS. First and second hard bias layers abut the first and second side surfaces respectively for longitudinally biasing the free layer. This longitudinal biasing maintains the free layer in a single magnetic domain state and helps to maintain the magnetic moment of the free layer parallel to the ABS when the read head is in the quiescent condition.

Magnetic head assemblies, wherein each magnetic head assembly includes a read head and a write head combination, are constructed in rows and columns on a wafer. After completion at the wafer level, the wafer is diced into rows of magnetic head assemblies and each row is lapped by a grinding process to lap the row to a predetermined air bearing surface (ABS). In a typical tunnel valve read head all of the layers are exposed at the ABS, namely first edges of each of the first shield layer, the seed layer, the free layer, the barrier layer, the pinned layer, the pinning layer and the second shield layer. Opposite edges of these layers are recessed in the head. The barrier layer is a very thin layer, on the order of 20 Å, which places the free and pinned layers very close to one another at the ABS. When a row of magnetic head assemblies is lapped there is a high risk of magnetic material from the free and pinned layers smearing across the barrier layer at the ABS to cause a short therebetween. Accordingly, there is a strong-felt need to construct magnetic head assemblies with tunnel valve heads without the risk of shorting between the free and pinned layers at the ABS due to lapping.

SUMMARY OF THE INVENTION

The present invention provides a read head which includes a tunnel valve sensor and first and second yoke layers wherein the tunnel valve sensor is recessed from the ABS and the first and second yoke layers are magnetically connected to the tunnel valve sensor and extend to the ABS for conducting signal fields from a rotating magnetic disk to the tunnel valve sensor. Because of the recessed location of the tunnel valve sensor, lapping of the head will not smear conductive material across the barrier layer of the tunnel valve sensor so as to short a tunneling current ($I_T$) across the barrier layer. In a preferred embodiment, a first yoke layer below the tunnel valve sensor is wide at the ABS and maintains its width as it extends into the head from the ABS. The first yoke layer provides a heat sink for the tunnel valve sensor. In contrast, the second yoke layer is very narrow at the ABS so as to establish and define a track width of the read head and increases in width from the ABS to a magnetic coupling to the tunnel valve sensor. With this arrangement a very narrow track width can be obtained while the width of the tunnel valve sensor is large so as to reduce resistance of the tunnel valve sensor to the tunneling current ($I_T$). From the tunnel valve sensor the second yoke layer maintains a larger width than the track width and provides another heat sink for the tunnel valve sensor. The distance between the first and second yoke layers at the ABS defines the read gap of the read head. This read gap is significantly less than when the tunnel valve sensor is located at the ABS and the read gap is defined by the distance between first and second shield layers. The narrow read gap enables more magnetic bits to be placed per linear inch along the track of the rotating magnetic disk. The narrow track width enables more tracks to be placed per inch along a radius of the rotating magnetic disk. A product of these two values, bits per inch (BPI) and tracks per inch (TPI), is the areal density of the read head. The first and second yokes enable a very high areal density which significantly increases the storage capacity of the magnetic disk drive.

The tunneling current ($I_T$) is conducted between top and bottom surfaces of the tunnel valve sensor. The invention provides first and second copper (Cu) structures wherein the first copper structure interfaces the bottom surface of the tunnel valve sensor and the second copper structure interfaces the top surface of the tunnel valve sensor. Both of these copper structures are employed for the purpose of conducting heat from the tunnel valve sensor during its operation. There are two preferred embodiments of the present invention. In both embodiments the second copper structure conducts heat from the tunnel valve sensor to the second yoke layer. In the first embodiment, the first copper structure conducts heat from the tunnel valve sensor to the first yoke layer and in the second embodiment the first copper structure conducts heats from the tunnel valve sensor to a substrate.

Still further in the first embodiment the top surface of the tunnel valve sensor may have a middle portion located between front and back top surface portions. The second yoke layer has first and second yoke layer portions wherein the first yoke layer portion has a front surface that forms a portion of the ABS. The first yoke layer portion of the second yoke layer interfaces the front top surface portion of the tunnel valve sensor and the second yoke layer portion of the second yoke layer interfaces the back top surface portion of the tunnel valve sensor. The second copper structure interfaces the middle top surface portion of the tunnel valve sensor and each of the first and second yoke layer portions of the second yoke layer. With this arrangement heat from the tunnel valve sensor is quickly dissipated into the second copper structure, thence into the first and second yoke layer portions of the second yoke layer which function as heat sinks. Still further, in the first embodiment the first copper structure is located between and interfaces each of the bottom surface of the tunnel valve sensor and a top surface of the first yoke layer so that heat is quickly dissipated into the first copper structure, thence into the first yoke layer which functions as a heat sink. In the first embodiment a tunneling current ($I_T$) source is connected across the second yoke layer portion of the second yoke layer and the first yoke layer so that the tunneling current is conducted between the top and bottom surfaces of the tunnel valve sensor.

In the second embodiment of the invention the first yoke layer has first and second yoke layer portions instead of the second yoke layer having first and second yoke layer portions. The second yoke layer is not divided into portions and extends from the ABS into the head across the top surface of the tunnel valve sensor. Between the top surface of the tunnel valve sensor and the second yoke layer is the second copper structure which absorbs heat from the top of the tunnel valve sensor and conducts it to the second yoke layer which functions as a heat sink. The tunnel valve sensor is located between the first and second yoke layer portions of the first yoke layer with the first yoke layer portion being located at the ABS and having a width that defines the track width (TW) of the read head. The distance between the first yoke layer portion of the first yoke and the second yoke layer defines the read gap of the read head and is significantly less than when the tunnel valve sensor is located at the ABS. Accordingly, the second embodiment can have high areal density similar to the first embodiment. In the second embodiment the first copper structure is located between and interfaces each of the bottom surface of the tunnel valve sensor and a top surface of a substrate which acts as a heat sink. Accordingly, heat from the bottom of the tunnel valve sensor is dissipated into the first copper structure, thence into the substrate. In the second embodiment the tunneling current ($I_T$) source is connected between the first copper structure and the second yoke layer so that the tunneling current ($I_T$) is conducted between the top and bottom surfaces of the tunnel valve sensor.

In both embodiments the tunnel valve sensor is wide so that its cross-section is large for conducting a larger tunneling current ($I_T$). This is made possible by the yoke layer that defines the track width increasing in width as it extends into the head toward the tunnel valve sensor.

An object of the present invention is to provide a low temperature yoke type tunnel valve sensor.

Another object is to provide a high areal density tunnel valve sensor wherein top and bottom copper structures dissipate heat from the tunnel valve sensor to heat sinks and are recessed from the ABS so as to be protected from corrosion.

A further object is to provide various methods for making the aforementioned tunnel valve sensors.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
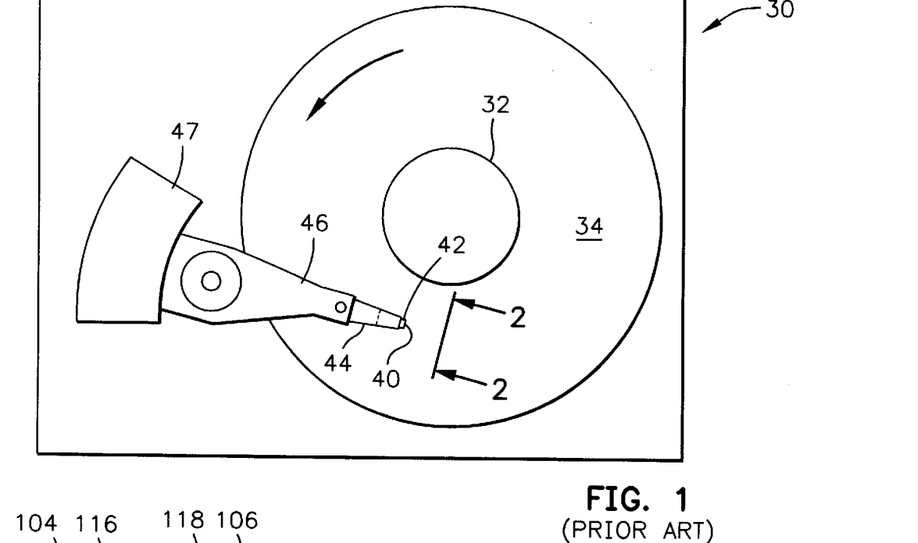
FIG. 1 is a plan view of an exemplary prior art magnetic disk drive.
Figure 2:
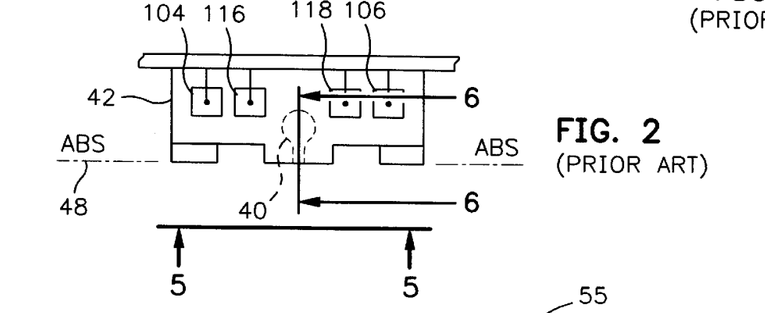
FIG. 2 is an end view of a slider with a magnetic head of the disk drive as seen in plane 2—2 of FIG. 1.
Figure 3:
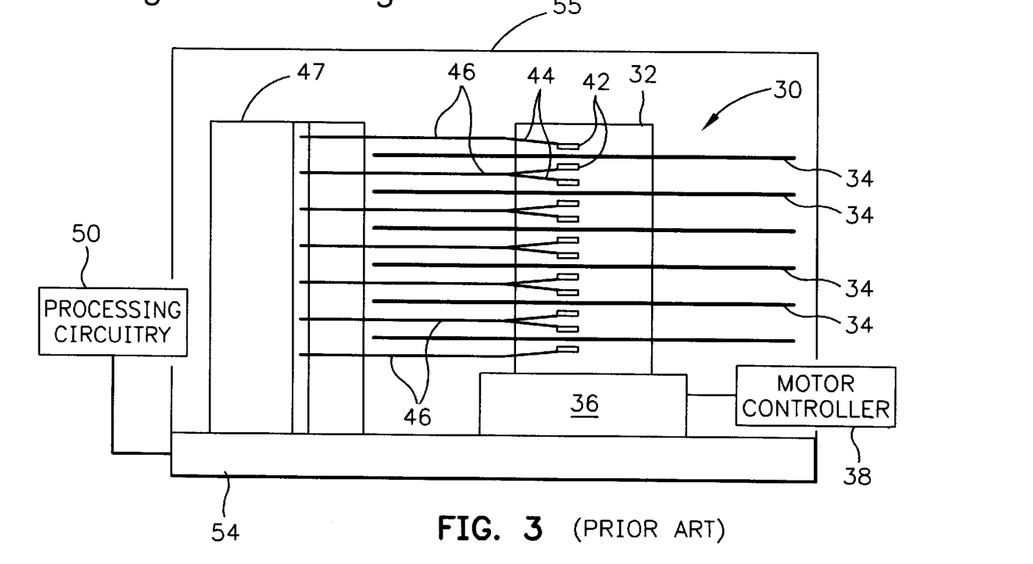
FIG. 3 is an elevation view of the magnetic disk drive wherein multiple disks and magnetic heads are employed.
Figure 4:
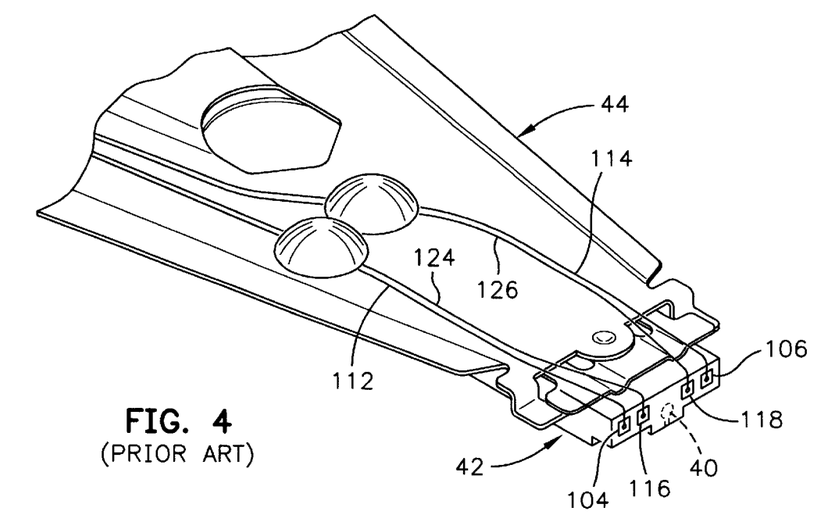
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals representing such information with the head 40, provides spindle motor drive signals for rotating the magnetic disk 34 and provides control signals to the actuator for moving the slider to various tracks. In FIG. 4 the slider 42 is shown mounted to a suspension 44. The components described hereinabove may be mounted on a frame 54 in a housing 55, as shown in FIG. 3.

Figure 5:
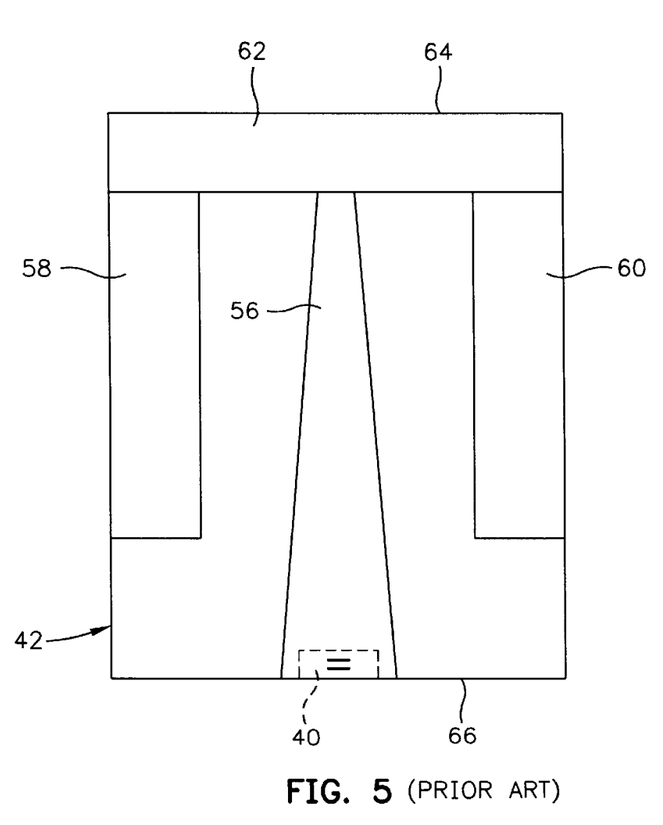
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
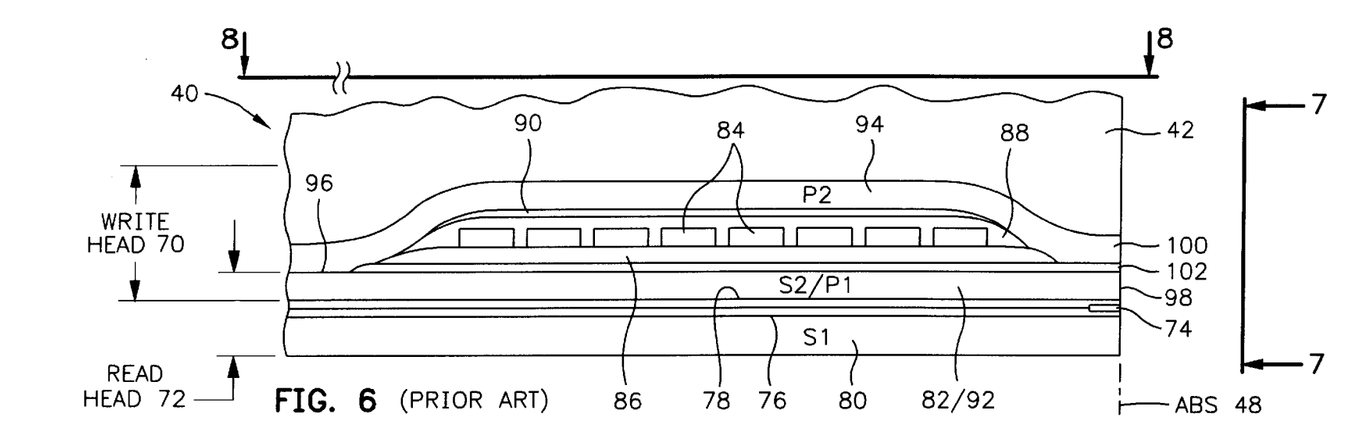
FIG. 6 is a partial view of the slider with a merged magnetic head as seen in plane 6—6 of FIG. 2.
Figure 7:
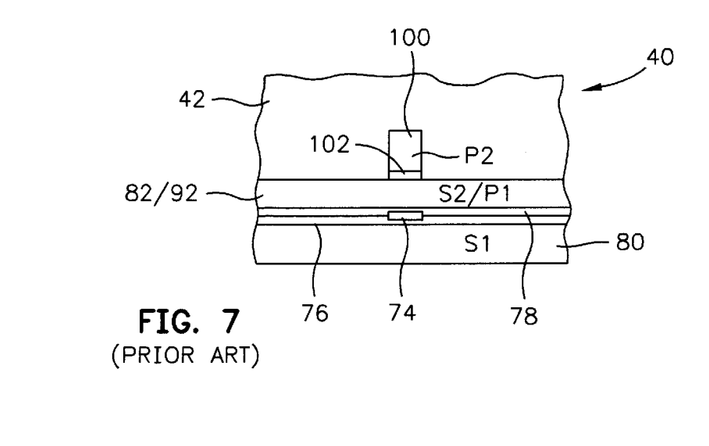
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a tunnel valve sensor 74 of the present invention. FIG. 7 is an ABS view of FIG. 6. The tunnel valve sensor 74 is sandwiched between ferromagnetic first and second shield layers 80 and 82. In response to external magnetic fields, the resistance of the tunnel valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel valve sensor 74 perpendicular to the planes of its major film surfaces by first and second shield layers 80 and 82 which serve as first and second leads. In a piggyback head (not shown) the second shield layer and the first pole piece layer are separate layers which are separated by a nonmagnetic isolation layer.

Figure 8:
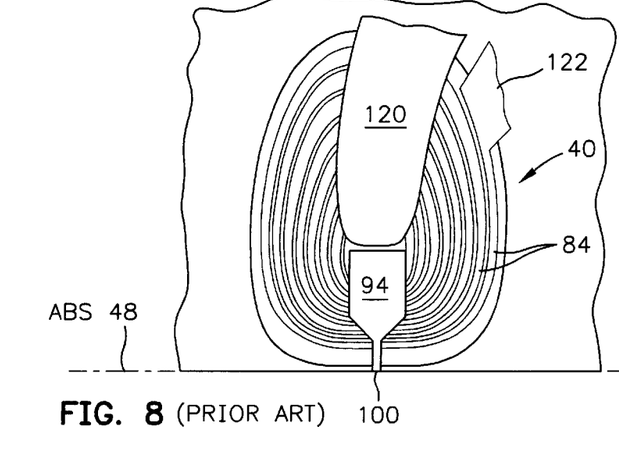
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the tunnel valve sensor 74 to leads 112 and 114 on the suspension 44, and third and fourth solder connections 116 and 118 connect leads 120 and 122 from the coil 84 (see FIG. 8) to leads 124 and 126 on the suspension.

The Invention

Figure 9:
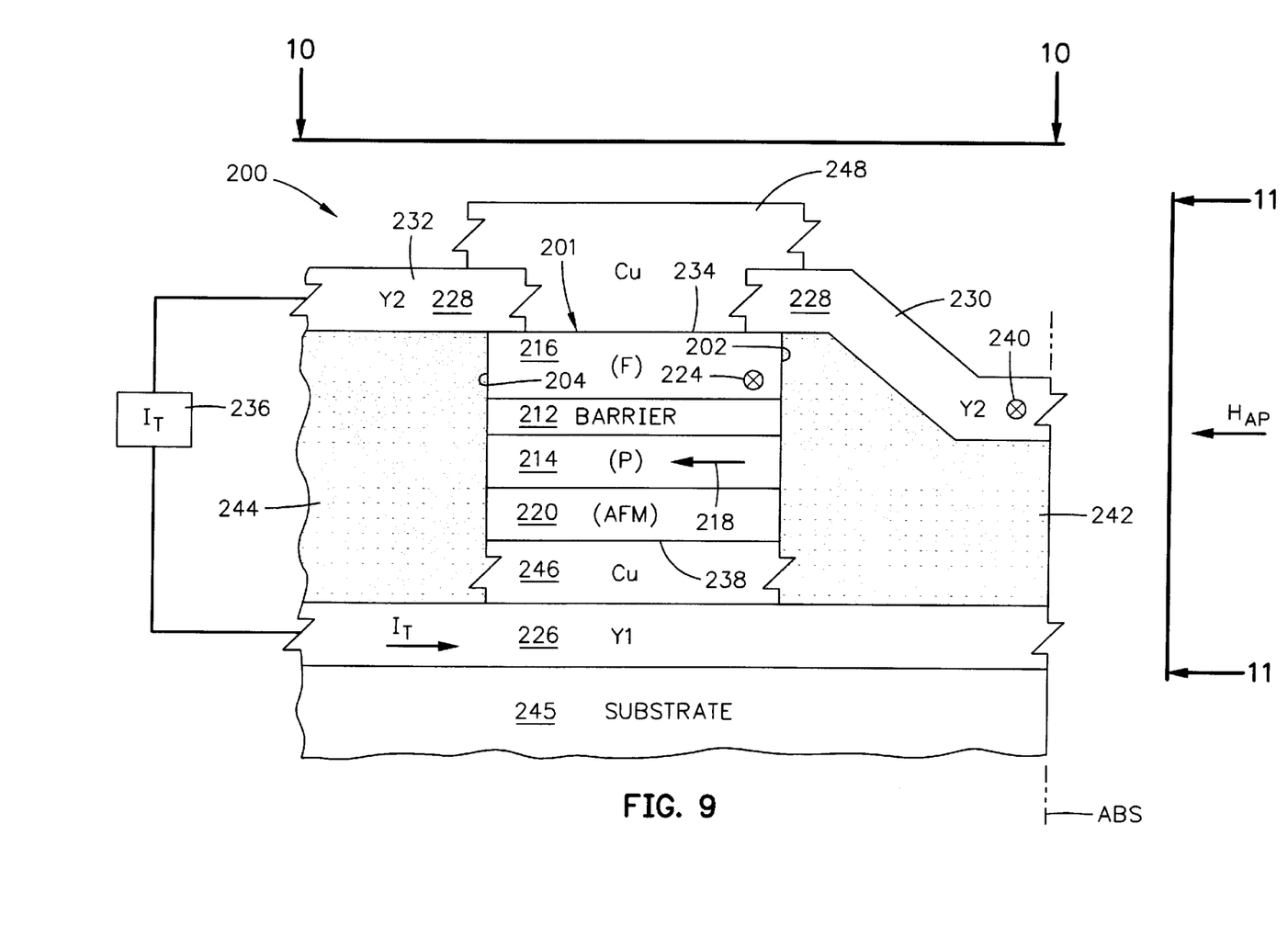
FIG. 9 is longitudinal cross-sectional view of the present yoke type tunnel valve sensor.

FIG. 9 is a longitudinal cross-sectional view of the present read head 200 with a tunnel valve sensor 201 which has front and back surfaces 202 and 204 and which is recessed in the head from the ABS. The tunnel valve sensor has an electrically nonconductive barrier layer 212 which is located between a pinned layer (P) 214 and a free layer (F) 216. The pinned layer 214 has a magnetic moment 218 which is pinned by an antiferromagnetic (AFM) pinning layer 220 perpendicular to the ABS in a direction from left to right or from right to left, as shown in FIG. 9. The free layer 216 has a magnetic moment 224 which is oriented parallel to the ABS and to the major planes of the layers. When a field signal HAP from a rotating magnetic disk is sensed by the tunnel valve sensor 200 the magnetic moment 224 of the free layer rotates. When the free layer 224 is rotated into the head by the field signal from the rotating magnetic disk the magnetic moments 224 and 218 become more parallel which reduces the resistance of the sensor to a tunneling current $I_T$ and when the signal field from the rotating magnetic disk rotates the magnetic moment 224 outwardly from the head, the magnetic moments 224 and 218 become more antiparallel which increases the resistance of the tunnel junction sensor to the tunneling current $I_T$. These resistance changes are processed as playback signals by the processing circuitry 50 in FIG. 3.

Figure 10:
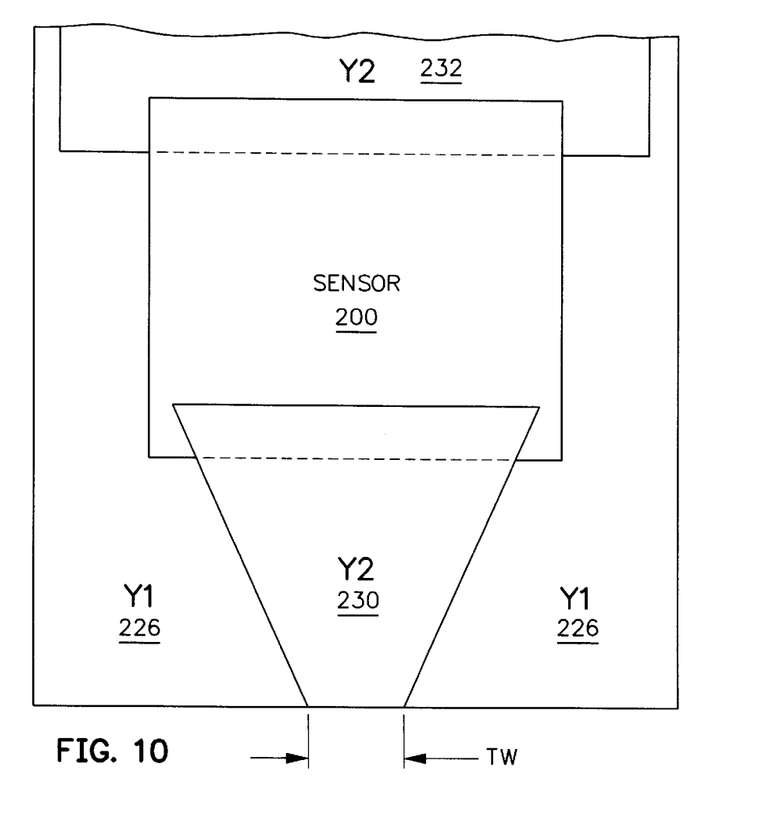
FIG. 10 is a view taken along plane 10—10 of FIG. 9 rotated 90° clockwise with insulation layers removed.
Figure 11:
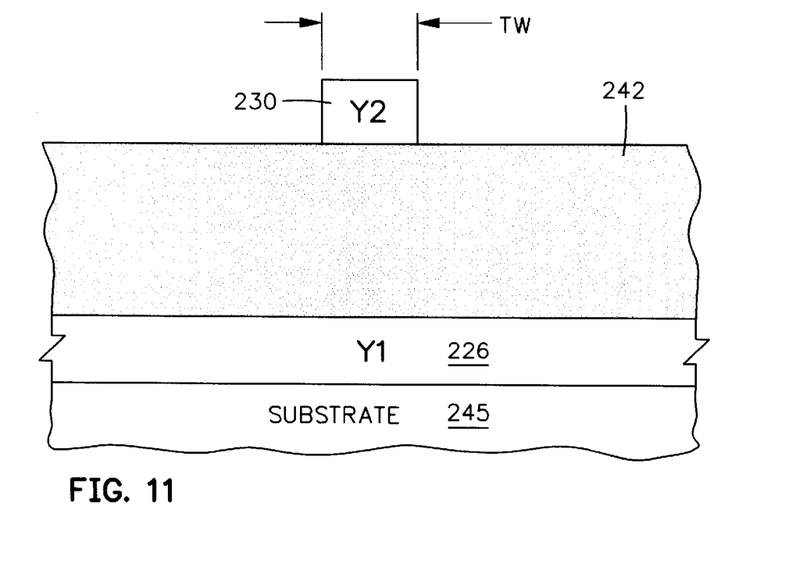
FIG. 11 is a view taken along plane 11—11 of FIG. 9.

FIGS. 9, 10 and 11 illustrate the first embodiment of the present invention. The tunnel valve sensor 201 is recessed in the head from the ABS and is located between first and second yoke layers (Y1) and (Y2) 226 and 228. The second yoke layer has first and second yoke layer portions 230 and 232 wherein the first yoke layer portion 230 has a narrow track width (TW) at the ABS and increases in width to a location where it interfaces a top front portion of a top surface 234 of the sensor. The first yoke layer 226 is wider than the first yoke layer portion 230 at the ABS and is spaced from the first yoke layer portion 230 to define the read gap of the read head. As discussed hereinabove, the product of the track width, which is quantified as tracks per inch (TPI) along the radius of the rotating magnetic disk, and the read gap, which is quantified as bits per inch (BPI) along the track of the rotating magnetic disk, is the areal density which indicates a storage capacity of the magnetic disk drive.

The first yoke portion 230 widens as it recesses into the head so that the tunnel valve sensor can be wide for increasing its cross-section and lowering its resistance to the tunneling current ($I_T$). The second yoke layer portion 232 interfaces a back surface portion of the top surface 234 of the tunnel valve sensor and, in combination with the first yoke layer 226, is connected to a tunneling current ($I_T$) source 236 for applying the tunneling current ($I_T$) between the top surface 234 and a bottom surface 238 of the sensor. The first yoke layer portion 230 has a magnetic moment 240 which can be rotated by the field signal (HAP) from the rotating magnetic disk. When the magnetic moment 240 is rotated the magnetic moment 224 of the free layer is rotated in the same direction so that the field signal is sensed by the sensor. The direction of rotation of the magnetic moment 224 determines whether the resistance of the tunnel valve sensor increases or decreases, which resistance changes are processed as playback signals by the processing circuitry 50 in FIG. 3, as discussed hereinabove. While the first yoke layer portion 230 is shown interfacing a top surface portion of the free layer 216 it should be understood alternatively that the first yoke layer portion 230 may abut the front surface 202 of the sensor. First and second insulation layers 242 and 244 are provided in front and in back of the sensor 201 for insulating the first and second yoke layers 226 and 228 from one another. The first yoke layer 226 may be located on a substrate (slider) 245. Between the components 230, 232 and 248 the first pole piece layer 82 in FIG. 6 there may be an insulation layer (not shown).

During operation of the sensor 201 a significant amount of heat can be generated which must be dissipated in order to prevent instability of the pinning of the magnetic moment 218 of the pinning layer. The first embodiment employs bottom and top copper structures 246 and 248 for this purpose. The bottom copper structure is located between and interfaces each of the bottom surface 238 of the sensor and a top surface of the first yoke layer 226. The top copper structure 248 interfaces a top middle surface portion of the top surface 234 of the sensor and each of the first and second yoke layer portions 230 and 232. Accordingly, the bottom copper structure 246 absorbs heat efficiently from the bottom of the sensor 200 and conducts this heat to the first yoke layer 226 which functions as a heat sink. The top copper structure 248 absorbs heat from the top of the sensor 200 and conducts this heat to the first and second yoke layer portions 230 and 232 which function as heat sinks. It should be noted that the bottom and top copper structures 246 and 248 are recessed from the ABS so that they are not exposed to the outside environment and corrosion that is typically inherent with copper.

Figure 12:
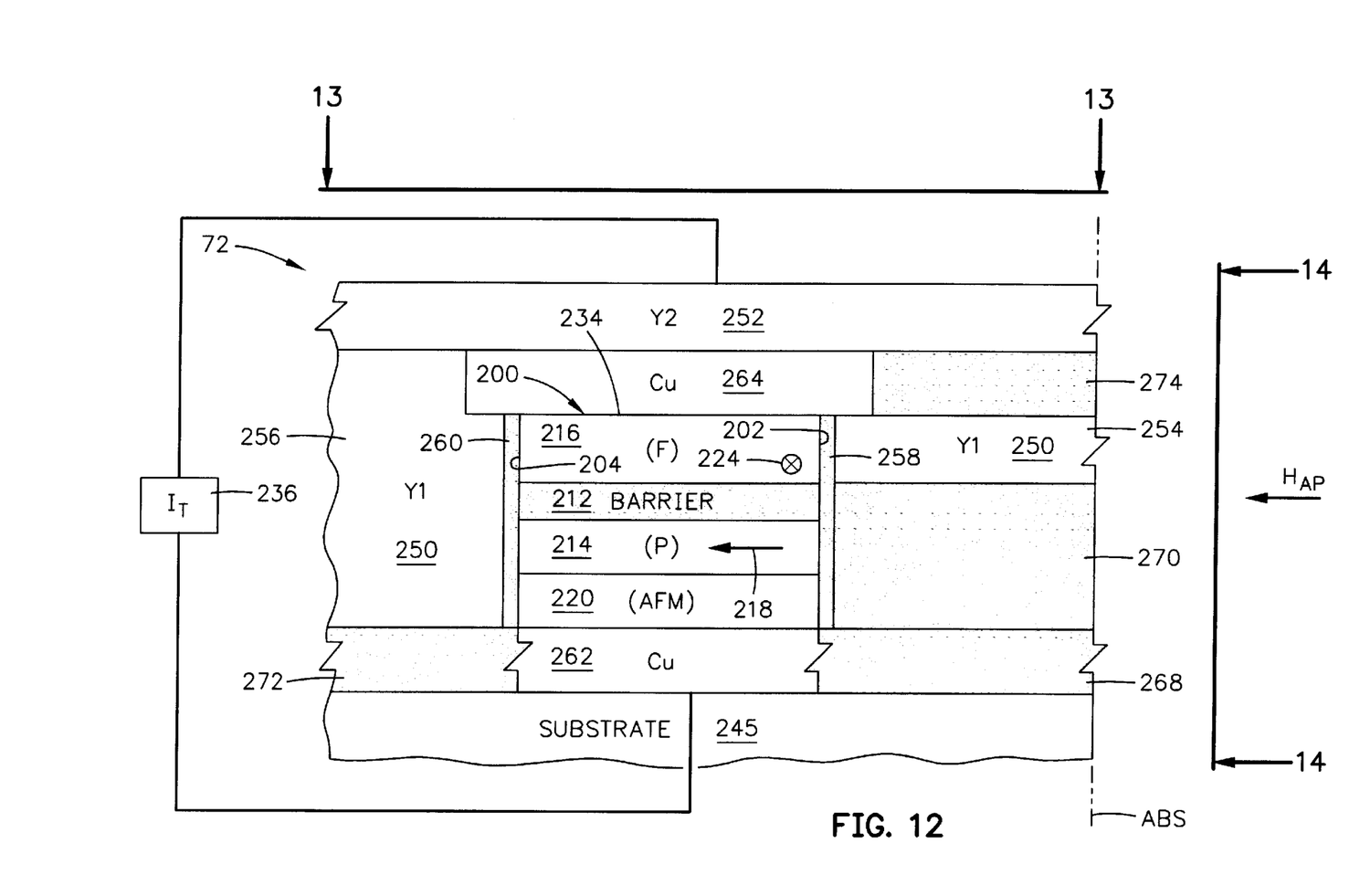
FIG. 12 is a longitudinal cross-sectional view of a second embodiment of the present yoke type tunnel valve sensor.
Figure 13:
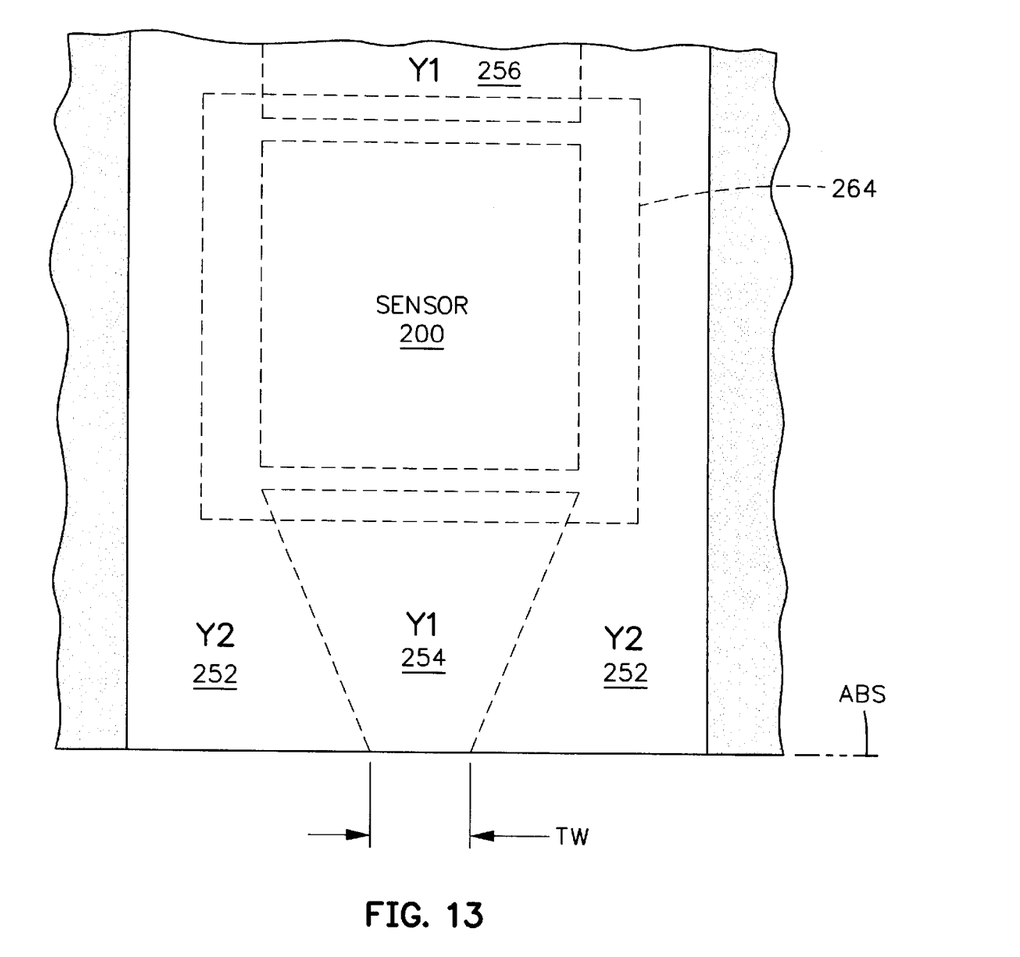
FIG. 13 is a view taken along plane 13—13 of FIG. 12 rotated 90° clockwise with insulation layers above the metal components removed.
Figure 14:
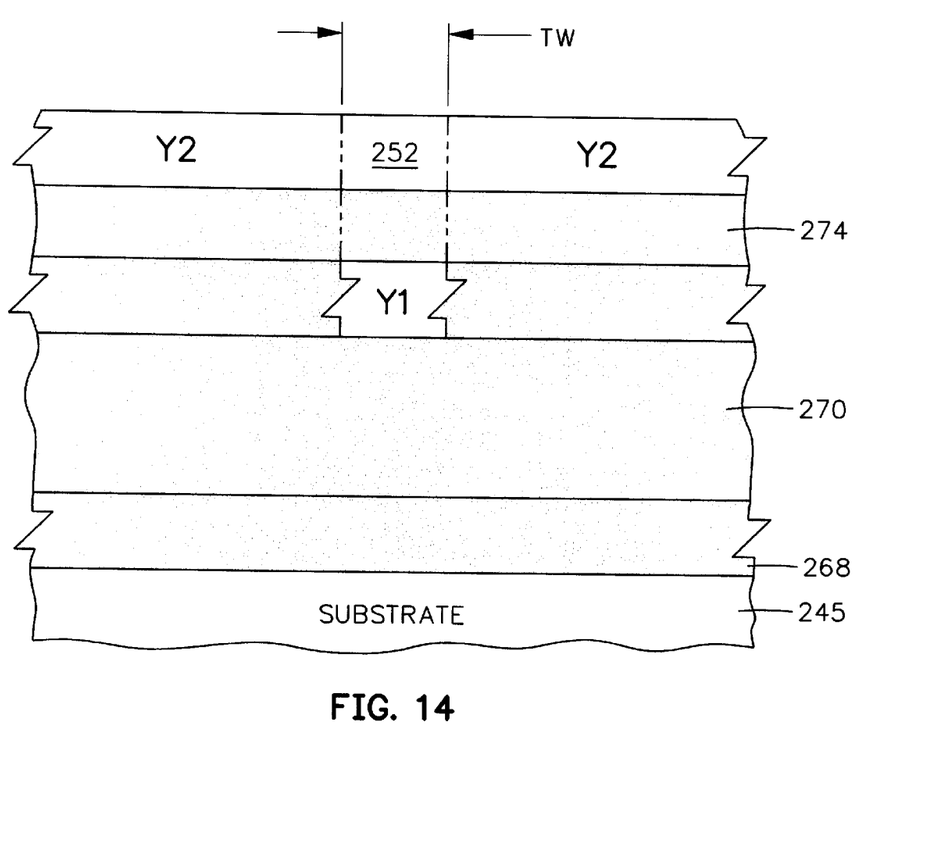
FIG. 14 is a view taken along plane 14—14 of FIG. 12.

A second embodiment of the present yoke type tunnel valve sensor 72 is illustrated in FIGS. 12, 13 and 14. In this embodiment, first and second yoke layers (Y1) and (Y2) 250 and 252 are provided wherein the first yoke layer 250 has first and second yoke layer portions 254 and 256. The sensor 200 is recessed in the head and is located between the first and second yoke layer portions 254 and 256 with the first yoke layer portion 254 having a narrow width at the ABS which defines the track width (TW) of the read head and which widens as it extends into the head opposite the front surface 202 of the sensor. An electrically nonconductive insulation layer 258 is located between the front surface 202 of the sensor and the first yoke layer portion 254 and a second electrically nonconductive insulation layer 260 is located between the back surface 204 of the sensor and the second yoke layer portion 256 so that the tunneling current ($I_T$) is confined between the top and bottom surfaces of the sensor. The second yoke layer 252 is not divided into portions and is spaced from the first yoke layer portion 254 at the ABS for defining the read gap of the read head. This read gap, in combination with the track width, determines the areal density of this read head, as discussed hereinabove. The second embodiment also has bottom and top copper structures 262 and 264 for dissipating heat from the bottom and top surfaces of the sensor. The substrate 245, which may be nickel phosphorous (NiP), is provided. The bottom copper structure 262 is located between and interfaces the bottom surface of the sensor and the top surface of the substrate 245 for dissipating heat from the bottom of the sensor to the substrate which serves as a heat sink. The top copper structure 264 interfaces the top surface 234 of the sensor and top surface portions of each of the first yoke layer portion 254 and the second yoke layer portion 256. The top copper structure 264 also interfaces a bottom surface portion of the second yoke layer 252. The second yoke layer 252 serves as a major heat sink while the first and second yoke layer portions 254 and 256 serve as secondary heat sinks. It should be noted, however, that the first and second yoke layer portions 254 and 256 and the second yoke layer 252 are electrically connected by the top copper structure 264. In this embodiment the tunneling current ($I_T$) source 236 is connected across the bottom copper structure 262 and the second yoke layer 252 so that the tunneling current ($I_T$) is conducted between the top and bottom surfaces of the sensor. Electrically nonconductive insulation layers 268 and 270 insulate the bottom copper structure 262 from the first yoke layer portion 254 and an electrically nonconductive insulation layer 272 insulates the bottom copper structure 262 from the second yoke layer portion 256. Further, electrically nonconductive insulation layers 274 and 276 insulate the first and second yoke layer portions 254 and 256 from the second yoke layer 252. The thickness of the insulation layer 274 defines the aforementioned read gap. An insulation layer (not shown) may be located between the second yoke layer 252 and the first pole piece layer 82 in FIG. 6.

Discussion

The material of the yoke layers is preferably nickel iron (NiFe) and the material of the insulation layers is preferably aluminum oxide ($Al_2O_3$). It should be understood that the sensor 200 may be a top sensor wherein the order of the layers of the sensor are reversed instead of a bottom sensor, as shown in the figures. It should be noted that with either embodiment of the invention first and second shield layers (S1) and (S2) (see FIG. 6) are not eliminated. Exemplary thicknesses of the components in FIG. 9 are 200 Å for the sensor 201, 0.1 $\mu$m for the layer 246, 4 $\mu$m for the layer 248, 2 $\mu$m for the layers 226 and 228 and 0.2 $\mu$m for the layer 230. The same thicknesses apply to FIG. 12 except 0.05 $\mu$m for the layers 274, 264 and 276 and 2 $\mu$m for the layer 252.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic head assembly which has an air bearing surface (ABS), comprising:
   a read head including:
   a tunnel valve sensor recessed from the ABS and having top and bottom surfaces;
   ferromagnetic first and second yoke layers;
   a first copper structure interfacing the bottom surface of the tunnel valve sensor;
   a second copper structure interfacing the top surface of the tunnel valve sensor and the second yoke layer;
   the first copper structure also interfacing the first yoke layer;
   the top surface of the tunnel valve sensor having a middle top surface portion located between spaced apart front and back top surface portions;

the second yoke layer having first and second spaced apart yoke layer portions wherein the first yoke layer portion has a front surface that forms a portion of the ABS and interfaces the front top surface portion of the tunnel valve sensor and the second yoke layer portion interfaces the back top surface portion of the tunnel valve sensor; and the second copper structure interfacing the middle top surface portion of the tunnel valve sensor and each of the first and second yoke layer portions of the second yoke layer.

2. A magnetic head assembly as claimed in claim 1 wherein the first yoke layer portion of the second yoke layer increases in width from said ABS to the tunnel valve sensor.

3. A magnetic head assembly as claimed in claim 2 including tunneling current source means connected across the first yoke layer and the second yoke layer portion of the second yoke layer.

4. A magnetic head assembly which has an air bearing surface (ABS), comprising:

a read head including:

a tunnel valve sensor recessed from the ABS and having top and bottom surfaces;

ferromagnetic first and second yoke layers;

a first copper structure interfacing the bottom surface of the tunnel valve sensor;

a second copper structure interfacing the top surface of the tunnel valve sensor and the second yoke layer;

a substrate;

the first copper structure also interfacing the substrate;

the first yoke layer having first and second yoke layer portions with a space therebetween;

the tunnel valve sensor being located in said space between the first and second yoke layer portions of the first yoke layer; and the second copper structure also interfacing each of the first and second yoke layer portions of the first yoke layer.

5. A magnetic head assembly as claimed in claim 4 including tunneling current source means connected across the first copper structure and the second yoke layer.

6. A magnetic head assembly as claimed in claim 5 wherein the first and second yoke layers extend from the tunnel valve sensor to the ABS and are spaced apart by a distance that defines a read gap of the head assembly.

7. A magnetic head assembly as claimed in claim 6 including:

the second yoke layer having a width at the ABS that defines a read track of the magnetic head assembly; and the second yoke layer increasing in width as it recesses in the head from the ABS.

8. A magnetic head assembly as claimed in claim 7 wherein the tunnel valve sensor includes:

a ferromagnetic pinned layer that has a magnetic moment;

an antiferromagnetic pinning layer exchange coupled to the pinned layer for pinning the magnetic moment of the pinned layer;

a ferromagnetic free layer that has a magnetic moment; and a nonmagnetic electrically insulative barrier layer located between the free layer and the pinned layer.

9. A magnetic head assembly as claimed in claim 8 wherein the magnetic head assembly further comprises:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions.

10. A magnetic disk drive including at least one magnetic head assembly that has a write head, a read head and an air bearing surface (ABS) comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

the read head including:

a tunnel valve sensor recessed from the ABS and having top and bottom surfaces;

ferromagnetic first and second yoke layers;

a first copper structure interfacing the bottom surface of the tunnel valve sensor; and a second copper structure interfacing the top surface of the tunnel valve sensor and the second yoke layer;

the tunnel valve sensor including:

a ferromagnetic pinned layer that has a magnetic moment;

an antiferromagnetic pinning layer exchange coupled to the pinned layer for pinning the magnetic moment of the pinned layer;

a ferromagnetic free layer that has a magnetic moment;

a nonmagnetic electrically insulative barrier layer located between the free layer and the pinned layer;

the first copper structure also interfacing the first yoke layer;

the top surface of the tunnel valve sensor having a middle top surface portion located between spaced apart front and back top surface portions;

the second yoke layer having first and second spaced apart yoke layer portions wherein the first yoke layer portion has a front surface that forms a portion of the ABS and interfaces the front top surface portion of the tunnel valve sensor and the second yoke layer portion interfaces the back top surface portion of the tunnel valve sensor; and the second copper structure interfacing the middle top surface portion of the tunnel valve sensor and each of the first and second yoke layer portions of the second yoke layer;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

11. A magnetic disk drive as claimed in claim 10 wherein the first yoke layer portion of the second yoke layer increases in width from said ABS to the tunnel valve sensor.

12. A magnetic disk drive as claimed in claim 11 including tunneling current source means connected across the first yoke layer and the second yoke layer portion of the second yoke layer.

13. A magnetic disk drive including at least one magnetic head assembly that has a write head, a read head and an air bearing surface (ABS) comprising:
   the write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   the read head including:
      a tunnel valve sensor recessed from the ABS and having top and bottom surfaces;
      ferromagnetic first and second yoke layers;
      a first copper structure interfacing the bottom surface of the tunnel valve sensor; and
      a second copper structure interfacing the top surface of the tunnel valve sensor and the second yoke layer;
   the tunnel valve sensor including:
      a ferromagnetic pinned layer that has a magnetic moment;
      an antiferromagnetic pinning layer exchange coupled to the pinned layer for pinning the magnetic moment of the pinned layer;
      a ferromagnetic free layer that has a magnetic moment; and
      a nonmagnetic electrically insulative barrier layer located between the free layer and the pinned layer;
   a substrate;
   the first copper structure also interfacing the substrate;
   the first yoke layer having first and second yoke layer portions;
   the tunnel valve sensor being located between the first and second yoke layer portions of the first yoke layer; and
   the second copper structure also interfacing each of the first and second yoke layer portions of the first yoke layer;
   a housing;
   a magnetic disk rotatably supported in the housing;
   a support mounted in the housing for supporting the magnetic head assembly with said ABS facing the magnetic disk so that the magnetic head assembly is in a transducing relationship with the magnetic disk;
   a spindle motor for rotating the magnetic disk;
   an actuator positioning means connected to the support for moving the magnetic head assembly to multiple positions with respect to said magnetic disk; and
   a processor connected to the magnetic head assembly, to the spindle motor and to the actuator for exchanging signals with the magnetic head assembly, for controlling movement of the magnetic disk and for controlling the position of the magnetic head assembly.

14. A magnetic disk drive as claimed in claim 13 including tunneling current source means connected across the first copper structure and the second yoke layer.

15. A method of making a magnetic head assembly which has an air bearing surface (ABS), comprising the steps of:
   making a read head including the steps of:
      forming a tunnel valve sensor recessed from the ABS and having top and bottom surfaces;
      forming ferromagnetic first and second yoke layers;
      forming a first copper structure interfacing the bottom surface of the tunnel valve sensor; and
      forming a second copper structure interfacing the top surface of the tunnel valve sensor and the second yoke layer.

16. A method of making a magnetic head assembly which has an air bearing surface (ABS), comprising the steps of:
   making a read head including the steps of:
      forming a tunnel valve sensor recessed from the ABS and having top and bottom surfaces;
      forming ferromagnetic first and second yoke layers;
      forming a first copper structure interfacing the bottom surface of the tunnel valve sensor;
      forming a second copper structure interfacing the top surface of the tunnel valve sensor and the second yoke layer;
      forming the first copper structure also interfacing the first yoke layer;
      forming the top surface of the tunnel valve sensor with a middle top surface portion between spaced apart front and back top surface portions;
      forming the second yoke layer with first and second spaced apart yoke layer portions with the first yoke layer portion having a front surface that forms a portion of the ABS;
      forming the first yoke layer portion of the second yoke layer interfacing the front top surface portion of the tunnel valve sensor and the second yoke layer portion of the second yoke layer interfacing the back top surface portion of the tunnel valve sensor; and
      forming the second copper structure interfacing the middle top surface portion of the tunnel valve sensor and each of the first and second yoke layer portions of the second yoke layer.

17. A method as claimed in claim 16 including forming the first yoke layer portion of the second yoke layer with an increasing width from said ABS to the tunnel valve sensor.

18. A method as claimed in claim 17 including connecting sense current source means across the first yoke layer and the second yoke layer portion of the second yoke layer.

19. A method of making a magnetic head assembly which has an air bearing surface (ABS), comprising the steps of:
   making a read head including the steps of:
      forming a tunnel valve sensor recessed from the ABS and having top and bottom surfaces;
      forming ferromagnetic first and second yoke layers;
      forming a first copper structure interfacing the bottom surface of the tunnel valve sensor;
      forming a second copper structure interfacing the top surface of the tunnel valve sensor and the second yoke layer;
      forming a substrate;
      forming the first copper structure also interfacing the substrate;
      forming the first yoke layer with first and second yoke layer portions;
      forming the tunnel valve sensor between the first and second yoke layer portions of the first yoke layer; and forming the second copper structure also interfacing each of the first and second yoke layer portions of the first yoke layer.

20. A method as claimed in claim 19 including connecting tunneling current source means across the first copper structure and the second yoke layer.

21. A method as claimed in claim 20 wherein the first and second yoke layers are formed to extend from the tunnel valve sensor to the ABS and to be spaced by a distance that defines the read gap of the head assembly.

22. A method as claimed in claim 21 including;
  forming the second yoke layer with a width at the ABS that defines a read track of the magnetic head assembly; and
  forming the second yoke layer with an increasing width as it recesses in the head from the ABS.

23. A method as claimed in claim 22 wherein the tunnel valve sensor is made comprising the steps of:
  forming a ferromagnetic pinned layer that has a magnetic moment;
  forming an antiferromagnetic pinning layer exchange coupled to the pinned layer for pinning the magnetic moment of the pinned layer;
  forming a ferromagnetic free layer that has a magnetic moment; and
  forming a nonmagnetic electrically insulative barrier layer between the free layer and the pinned layer.

24. A method as claimed in claim 23 wherein the making of the magnetic head assembly further comprises the steps of:
  forming a write head including the steps of:
    forming ferromagnetic first and second pole piece layers that have a yoke portion located between a pole tip portion and a back gap portion;
    forming a nonmagnetic write gap layer between the pole tip portions of the first and second pole piece layers;
    forming an insulation stack with at least one coil layer embedded therein between the yoke portions of the first and second pole piece layers; and
    connecting the first and second pole piece layers at their back gap portions.

25. A magnetic head assembly which has an air bearing surface (ABS), comprising:
  a read head including:
    a tunnel valve sensor recessed from the ABS and having top and bottom surfaces;
    ferromagnetic first and second yoke layers;
    a first copper structure interfacing the bottom surface of the tunnel valve sensor;
    a second copper structure interfacing the top surface of the tunnel valve sensor and the second yoke layer;
    a substrate;
    the first copper structure also interfacing the substrate;
    the first yoke layer having first and second yoke layer portions;
    the tunnel valve sensor being located between the first and second yoke layer portions of the first yoke layer;
    the second copper structure also interfacing each of the first and second yoke layer portions of the first yoke layer; and
    the substrate being nickel phosphorous (NiP).

26. A magnetic head assembly which has an air bearing surface (ABS), comprising:
  a read head including:
    a tunnel valve sensor recessed from the ABS and having top and bottom surfaces;
    ferromagnetic first and second yoke layers;
    a first copper structure interfacing the bottom surface of the tunnel valve sensor;
    a second copper structure interfacing the top surface of the tunnel valve sensor and the second yoke layer;
    a substrate;
    the first copper structure also interfacing the substrate;
    the first yoke layer having first and second yoke layer portions;
    the tunnel valve sensor being located between the first and second yoke layer portions of the first yoke layer;
    the second copper structure also interfacing each of the first and second yoke layer portions of the first yoke layer;
    the substrate being nickel phosphorous (NiP);
    the first and second yoke layers extending from the tunnel valve sensor to the ABS and being spaced apart by a distance that defines a read gap of the head assembly;
    the second yoke layer having a width at the ABS that defines a read track of the magnetic head assembly;
    the second yoke layer increasing in width as it recesses in the head from the ABS;
  the tunnel valve sensor including:
    a ferromagnetic pinned layer that has a magnetic moment;
    an antiferromagnetic pinning layer exchange coupled to the pinned layer for pinning the magnetic moment of the pinned layer;
    a ferromagnetic free layer that has a magnetic moment;
    a nonmagnetic electrically insulative barrier layer located between the free layer and the pinned layer;
  a write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and
    the first and second pole piece layers being connected at their back gap portions.

27. A magnetic disk drive including at least one magnetic head assembly that has a write head, a read head and an air bearing surface (ABS) comprising:
  the write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and
    the first and second pole piece layers being connected at their back gap portions;
  the read head including:
    a tunnel valve sensor recessed from the ABS and having top and bottom surfaces;
    ferromagnetic first and second yoke layers;
    a first copper structure interfacing the bottom surface of the tunnel valve sensor;

a second copper structure interfacing the top surface of the tunnel valve sensor and the second yoke layer;
a substrate;
the first copper structure also interfacing the substrate;
the first yoke layer having first and second yoke layer portions;
the tunnel valve sensor being located between the first and second yoke layer portions of the first yoke layer;
the second copper structure also interfacing each of the first and second yoke layer portions of the first yoke layer;
the substrate being nickel phosphorous (NiP);
the tunnel valve sensor including:
  a ferromagnetic pinned layer that has a magnetic moment;
  an antiferromagnetic pinning layer exchange coupled to the pinned layer for pinning the magnetic moment of the pinned layer;
  a ferromagnetic free layer that has a magnetic moment; and
  a nonmagnetic electrically insulative barrier layer located between the free layer and the pinned layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

* * * * *